United States Patent [19]

Tanabe

[11] Patent Number: 5,471,460
[45] Date of Patent: Nov. 28, 1995

[54] ATM SWITCHING SYSTEM WITH UNIT SWITCH SELECTING FUNCTION FOR AVOIDING FAULTY UNIT SWITCH

[75] Inventor: Senichi Tanabe, Tokyo, Japan

[73] Assignee: NEC Corporation, Tokyo, Japan

[21] Appl. No.: 213,797

[22] Filed: Mar. 16, 1994

Related U.S. Application Data

[63] Continuation-in-part of Ser. No. 110,735, Aug. 23, 1993, abandoned, which is a continuation of Ser. No. 781,319, Oct. 25, 1991, abandoned.

[30] Foreign Application Priority Data

Oct. 25, 1990 [JP] Japan .................................. 2-289635

[51] Int. Cl.$^6$ ...................................................... H04J 3/14
[52] U.S. Cl. .............................. 370/16; 370/60; 370/65.5
[58] Field of Search ................................. 370/16, 13, 17, 370/60, 60.1, 65.5, 94.1, 58.1, 58.2, 58.3; 340/826, 827; 379/219, 220, 221, 273

[56] References Cited

U.S. PATENT DOCUMENTS

| | | | |
|---|---|---|---|
| 4,862,161 | 8/1989 | Schomers | 340/825 |
| 4,956,839 | 9/1990 | Torii et al. | 370/60 |
| 4,983,961 | 1/1991 | Brunle et al. | 340/825 |
| 5,084,867 | 1/1992 | Tachibana et al. | 370/60 |
| 5,229,990 | 7/1993 | Teraslinna | 370/16 |
| 5,287,491 | 2/1994 | Hsu | 340/827 |

FOREIGN PATENT DOCUMENTS 4-160949  6/1992  Japan .

OTHER PUBLICATIONS

IEEE International Conference on Communications, Jean–Pierre Coudreuse, "ATM applications", Oct. 1991, pp. 231–234.

"D70 Model Automatic Switching System", edited by NTT (Nippon Telephone and Telegraph Co., Ltd, Jan. 15, 1993. In Japanese. No translation.

"ATM Switching Architecture for Broadband ISDN", IEEE Intl. Conf. on Communications, Phila., Pa., Jun. 12–15, 1988.

"Characteristics of a Cell Multiplexer for Bursty ATM Traffic", IEEE Intl. Conf. on Communications, Boston, Mass., Jun. 11–14, 1989.

"ATM Application", 6th World Telecommunication Symposium Forum, Geneva, Switzerland, Oct. 10–15, 1991.

Primary Examiner—Douglas W. Olms
Assistant Examiner—Huy D. Vu
Attorney, Agent, or Firm—Foley & Lardner

[57] ABSTRACT

A switching system with a switching network (10) of multistage construction applicable to ATM (Asynchronous Transfer Mode) is characterized in that each incoming line is wired in parallel to a plurality of unit switches in the first switching stage for selective connection, and each outgoing line is wired in parallel to a plurality of unit switches on the final stage for selective connection, the link transmission speed being higher than the transmission speed of the incoming and outgoing lines and a faulty unit switch being made "busy" and an alternate link being established via a unit switch in the same stage as the faulty unit switch.

6 Claims, 8 Drawing Sheets

ATM SWITCHING SYSTEM WITH UNIT SWITCH SELECTING FUNCTION FOR AVOIDING FAULTY UNIT SWITCH

This is a Continuation-in-Part Application of application Ser. No. 08/110,735, filed Aug. 23, 1993, now abandoned; which is a Continuation of application Ser. No. 07/781,319, filed Oct. 25, 1991, now abandoned.

BACKGROUND OF THE INVENTION

1. Field of the Invention

The present invention relates to an ATM (Asynchronous Transfer Mode) switching network and more particularly to a redundancy structure for use when a fault is found in the switching network.

The present invention is intended to provide an economical redundancy structure which is based on the idea of making a call bypass a faulty switch through an alternate route including a switch which belongs to the same switching stage as the faulty switch in an asynchronous transfer mode switching network.

2. Description of the Related Art

Although no redundancy structure for an ATM switching network has been made known before, conventional redundancy structures for electronic switching systems consist of two switching networks analogous to each other and are submitted to dual operation: one is used as the acting system while the other is disconnected and kept for use as a standby system. When trouble occurs in the acting system, the standby switching network is connected and the acting system is disconnected, thus maintaining the connections of lines through the switching system. The dual operation of the redundancy structure has been referred to in "D70 Model Automatic Switching System" edited by NTT (Nippon Telephone and Telegraph Co., Ltd.).

Figure 1A:
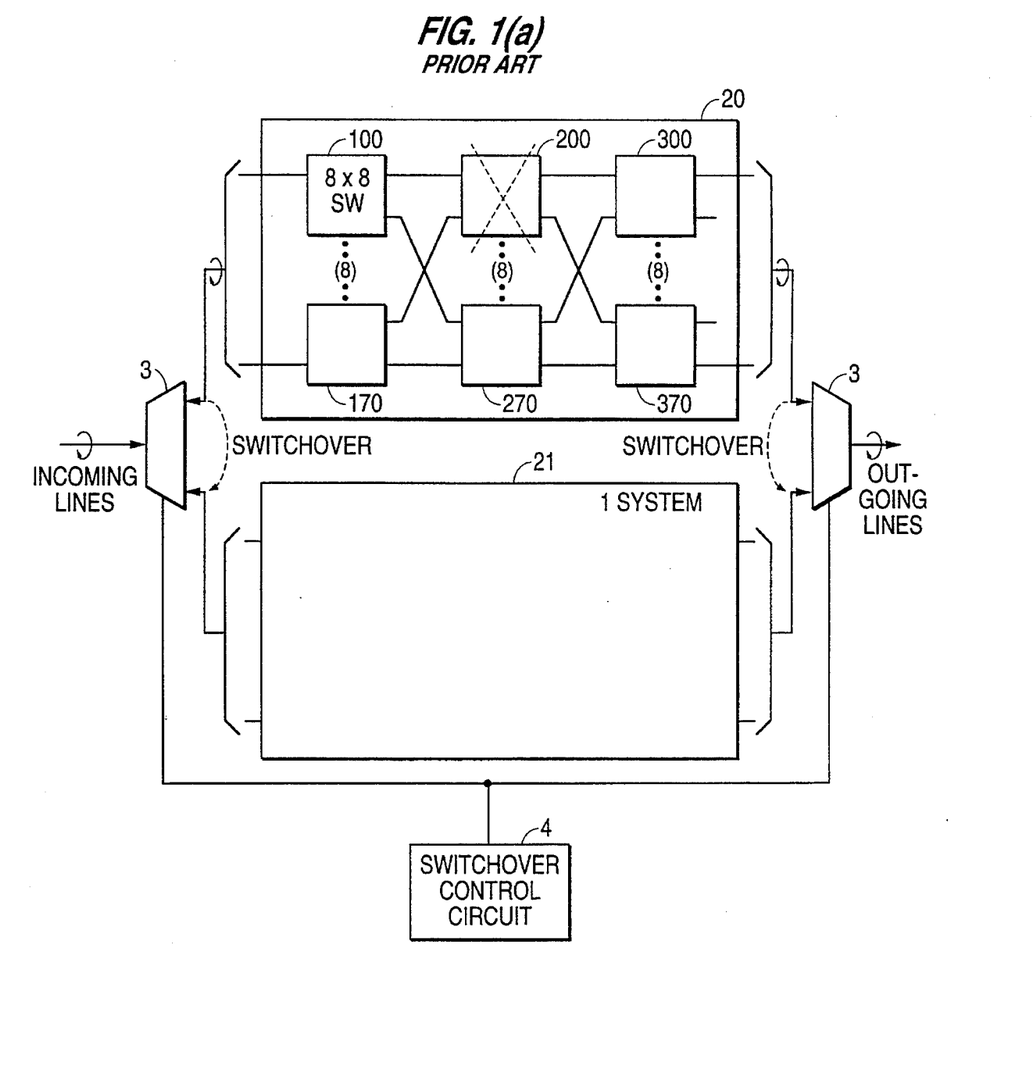
FIG. 1(a) is a block diagram illustrating the configuration of a conventional switching network.

FIG. 1(a) is a block diagram of a redundancy structure of a conventional switching network.

Figure 1B:
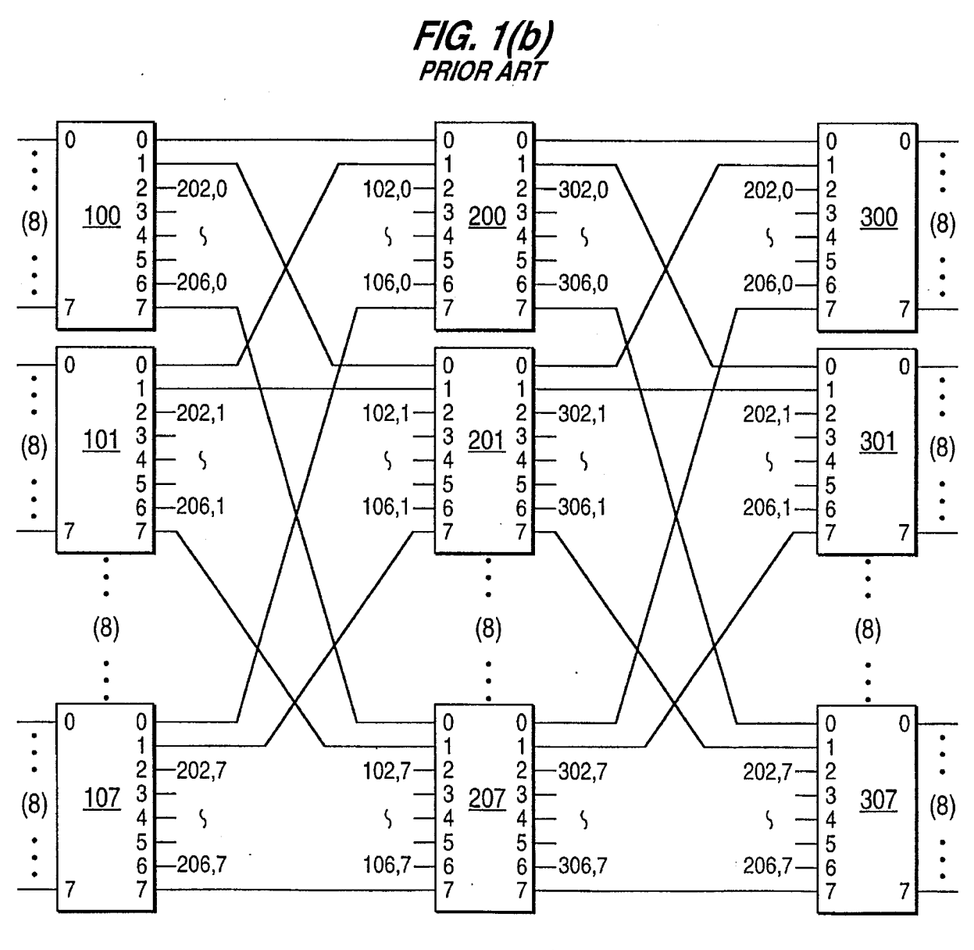
FIG. 1(b) is a diagram illustrating the link connection of either of the switching networks 20 or 21 shown in FIG. 1(a).

This switching network comprises two identical three-stage networks whose details are illustrated in FIG. 1(b), a 0-system switching network 20 and a 1-system switching network 21, switchover circuits 3 for choosing one of the switching networks, and a switchover control circuit 4 for directing the switchover operation. As illustrated in FIG. 1(b), each of the switching networks of the 0-system and the 1-system consist of eight unit switches in each stage of the three-stage networks. As one unit switch has eight incoming and eight outgoing terminals, eight incoming lines are connected to each of the eight unit switches 100, 101, . . . , 107, and eight outgoing lines are connected to each of eight unit switches 300, 301, . . . , 307.

Links between each adjoining stage are connected as follows:

Each of the eight links from outgoing terminals No. 0, 1, . . . , 7 of unit switch 100 of the first stage is connected to No. 0 incoming terminal of each unit switches 200, 201, . . , 207 in the second stage, respectively.

Each of the eight links from outgoing terminals No. 0, 1, . . . , 7 of unit switch 101 of the first stage is connected to No. 1 incoming terminal of each unit switches 200, 201, . . , 207 in the second stage, respectively.

In this manner, each of eight links from outgoing terminals No. 0, 1, . . . , 7 of unit switches 102, 103, . . . , 107 is connected to No. 2, 3, . . . , 7 incoming terminal of each unit switches 200, 201, . . . , 207 in the second stage, respectively.

As for links of unit switches 300, 301, . . . , 307 in the third stage, similar connection arrangement is provided to unit switches 200, 201, . . . , 207 in the second stage as shown in FIG. 1(b).

The 0-system switching network is used as the active system for communication, and the 1-system switching network remains as a standby system. When trouble occurs in one of the unit switches of the 0-system switching network 20, the switchover control circuit 4 gives the switchover circuit 3 a switchover command and all the incoming and outgoing lines are switched from the 0-system switching network 20 to the 1-system switching network 21. Fault detection is then carried out in the 0-system switching network. After the faulty switches have been replaced, the 0-system switching network 20 is restored for use.

The conventional electronic switching system thus necessitates a switchover circuit and switchover control circuit in addition to a double network which consists of a number of unit switches. The disadvantage is that such a switching system tends to be costly and bulky. Moreover, as the entire switching network is switched over even when only part of it malfunctions, all calls being communicated can be adversely affected. In other words, the disadvantage lies in the fact that a complicated series of circuits or software control is required to maintain continuity of any given call in areas other than the source of the problem during the switching over of the network.

In "A.T.M. switching architecture for broadband ISDN" at the IEEE International Conference on Communication '88 at Philadelphia, Pa. on Jun. 12–15, Messrs. Hajikano, Murakami, Iwabuchi, Isono, and Kobayashi disclosed a multi-stage self-routing switch network (MSSR) which can bypass a faulty unit switch in the second stage, but they did not disclose a redundancy structure, especially, parallel wiring to a plurality of unit switches at the first stage and final stage from each incoming line and outgoing line for selective connection nor did they disclose the increase in transmission speed of the link over the transmission speed of incoming and outgoing lines.

SUMMARY OF THE INVENTION

The object of the present invention is to obviate the foregoing drawbacks by a space expansion construction which increases the connection routes in parallel for each incoming and outgoing line at the first and final switching stage, respectively, and by speeding up the link transmission speed to at least twice the line transmission speed.

Another object of the present invention is to implement an economical redundancy structure which eliminates the need to provide another switching network of the same size.

A further object of the present invention is to provide a high quality telecommunication switching system with a low cell loss rate such that when any one of the unit switches is in trouble, the cell passing through that switch is only lost or suspended for a moment without any effect on the following cells.

To achieve the above objects, the present invention provides a switching network comprising a first circuit means in which each incoming line is wired in parallel to a plurality of unit switches in the first stage for selective connection with any one unit switch, a second circuit in which each outgoing line is wired in parallel to a plurality of unit switches in the final stage for selective connection with one unit switch, the link transmission speed being higher than the line transmission speed, and a control means to make a faulty unit switch "busy" and establish an alternate link via another unit switch in the same stage of the faulty switch.

DESCRIPTION OF THE PREFERRED EMBODIMENT

An embodiment of the present invention will now be described in reference to the accompanying drawings.

Figure 2A:
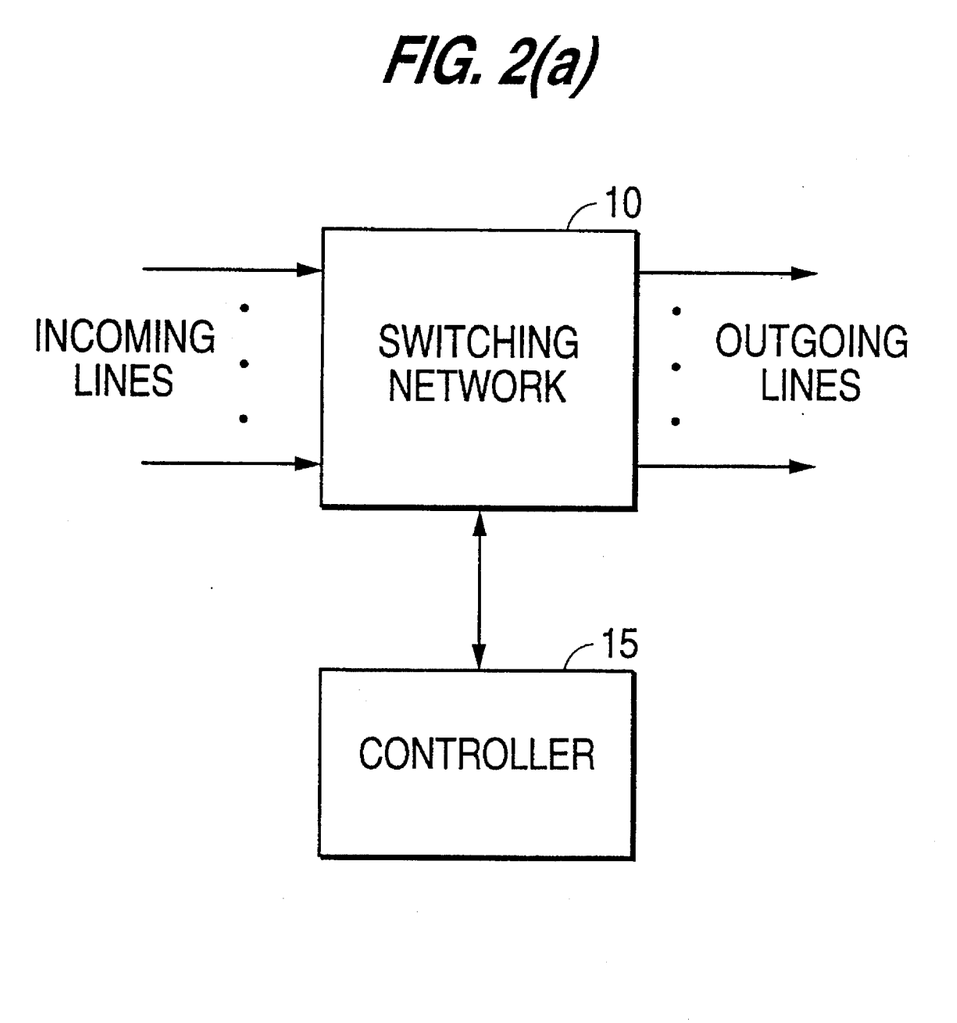
FIG. 2(a) is a block diagram illustrating the switching network embodying the present invention.
Figure 2B:
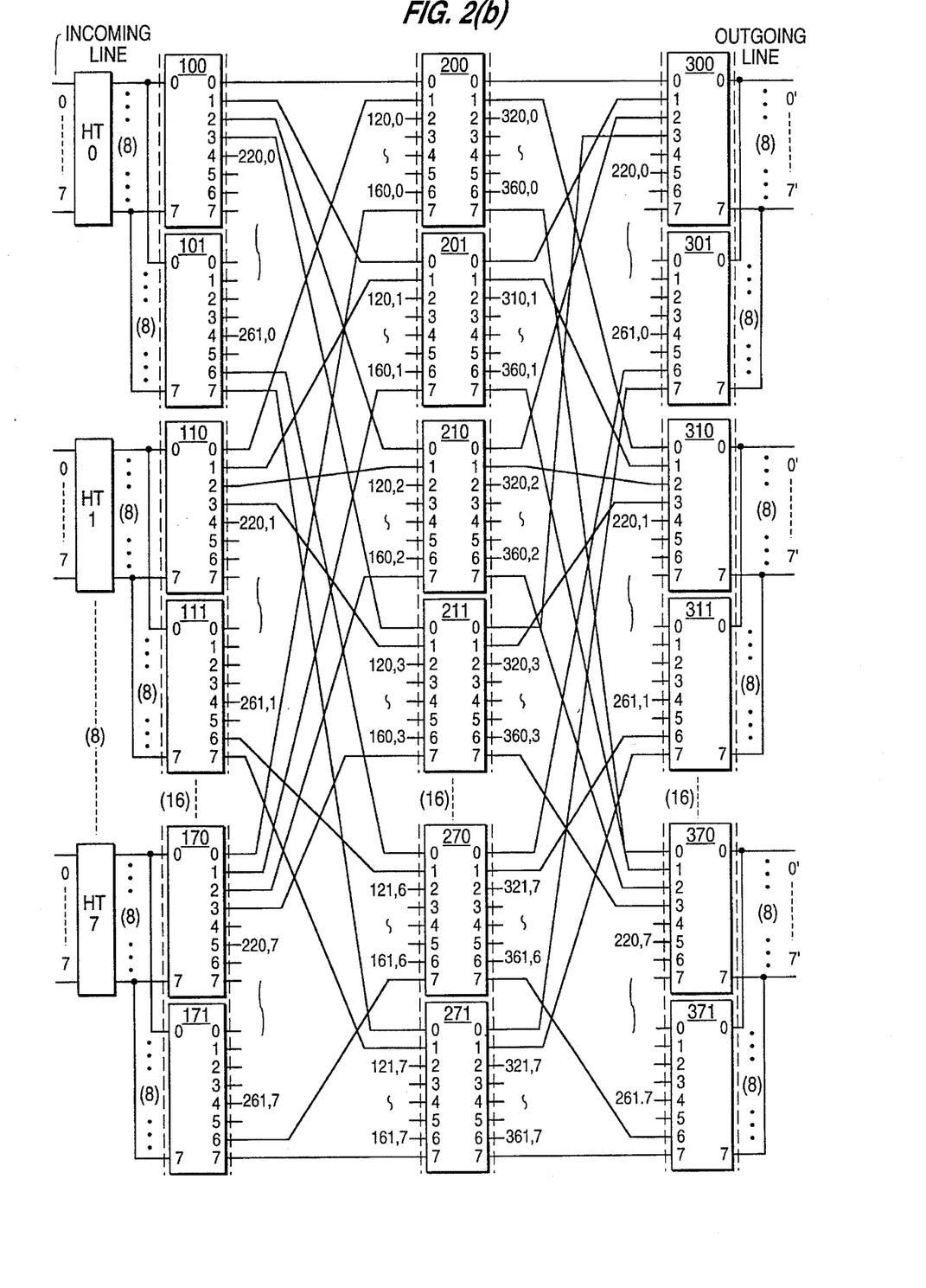
FIG. 2(b) is a diagram illustrating the link connection of the switching network 10 shown in FIG. 2(a).

As shown in FIGS. 2(a) and 2(b), a switching system according to the present invention has multistage configuration with links connecting unit switches between each adjoining stage. The switching system includes a switching network 10 in an asynchronous transfer mode, and a control unit 15 for controlling the link connection of the switching network 10. Further, the switching network 10 comprises sixteen unit switches in each stage of the three-stage networks, and each unit switch has eight incoming and eight outgoing terminals.

Among those sixteen unit switches in each stage, two unit switches form a pair (e.g., unit switches 100 and 101, unit switches 110 and 111, . . . , unit switches 170 and 171 form a pair in the first stage, and similar pairs are formed also in the second stage and the third stage).

Each of eight incoming lines for one unit switch in the first stage through a header translator (HT), which is provided in the preceding stage of the switching network for translating a header of each cell flowing for routing, is wired in parallel to each of unit switches forming a pair (e.g., unit switch 100 and unit switch 101), and each of eight outgoing lines for one unit switch in the third stage is wired in parallel to each of unit switches forming a pair (e.g., unit switch 300 and unit switch 301). Therefore, each of eight times eight incoming lines and outgoing lines are connected to the switching network 10.

As for link connection arrangement between each adjoining stage is as follows;

Each of eight links from outgoing terminals No. 0, 1, . . . , 7 of unit switch 100 of the first stage is connected to No. 0 incoming terminal of each eight unit switches 200, 201, 210, 211, 220, 221, 230 and 231 in the second stage, respectively, and each of eight links from outgoing terminals No. 0, 1, . . . , 7 of unit switch 101 of the first stage is connected to No. 0 incoming terminal of each eight unit switches 240, 241, 250, 251, 260, 261, 270 and 271 in the second stage, respectively.

Each of eight links from outgoing terminals No. 0, 1, . . . , 7 of unit switch 110 of the first stage is connected to No. 1 incoming terminal of eight each of unit switches 200, 201, . . . , 231 in the second stage, respectively, and each of eight links from outgoing terminals No. 0, 1, . . . , 7 of unit switch 111 of the first stage is connected to No. 1 incoming terminal of eight each of unit switches 240, 241, . . . , 271 in the second stage, respectively.

In this manner, each of eight links from unit switches 120, 121, . . . , 170, 171 is connected to No. 2, . . . , 7 incoming terminal of each unit switches 200, 201, . . . , 270, 271 in the second stage, respectively.

As for unit switches 300, 301, . . . , 370, 371 in the third stage, similar connection arrangement is provided to outgoing terminals of unit switches 200, 201, . . . , 270, 271 in the second stage as shown in FIG. 2(b).

Figure 5A:
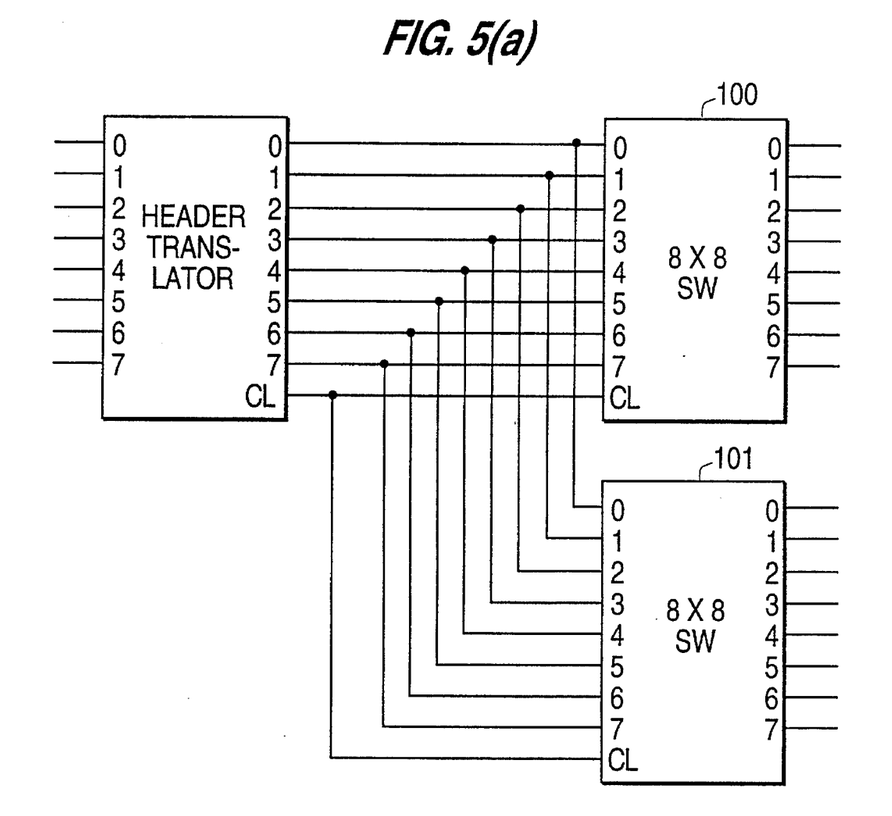
FIGS. 5(a) and 5(b) are diagrams illustrating space-expansion construction and higher link speed, respectively.

Moreover, the additional control line (CL) is provided between the header translator and paired unit switches in the first stage as shown in FIG. 5(a). In the header translator, additional one bit information is added per one byte incoming information for controlling purposes, and as one cell consists of 53 byte information, 53 bit information is transferred to the paired unit switches through the control line when the cell is transferred to the paired unit switches.

Another aspect of the present invention is that the link transmission speed is greater than the transmission speed of incoming and outgoing lines. The particular means for adjusting signal transmission speeds are well known and conventional in the art. For example, the input/output lines and the link transmission stages could be clocked at different times so that the link transmission speed is greater than the input/output line transmission speeds. The control unit 15 performs the function of making a faulty unit switch "busy" and establishing another link bypassing the faulty unit switch via another unit switch which belongs to the stage which includes the faulty unit switch.

The operation of the switching system is described below.

As previously mentioned, the control line is provided between the header translator and paired unit switches in the first stage, and the 53 bits information signal is transferred to those unit switches through the control line. Among those 53 bits information, one bit is used for the selection information which specifies one of paired unit switches to be used for routing the cell. That is, if the selection information indicates "0", the 0 side unit switch of the paired unit switches (unit switches 1X0 and 1X1) is specified to be used for the cell routing, and if the selection information indicates "1", the 1 side unit switch of the paired unit switches is used.

Therefore, although cells from an incoming line flow into both the unit switches by a parallel connection, only one unit switch is used for the cell routing based on the selection information which is transferred from the header translator. The header translator is provided this information by the central processor 28 shown in FIG. 6.

Figure 3:
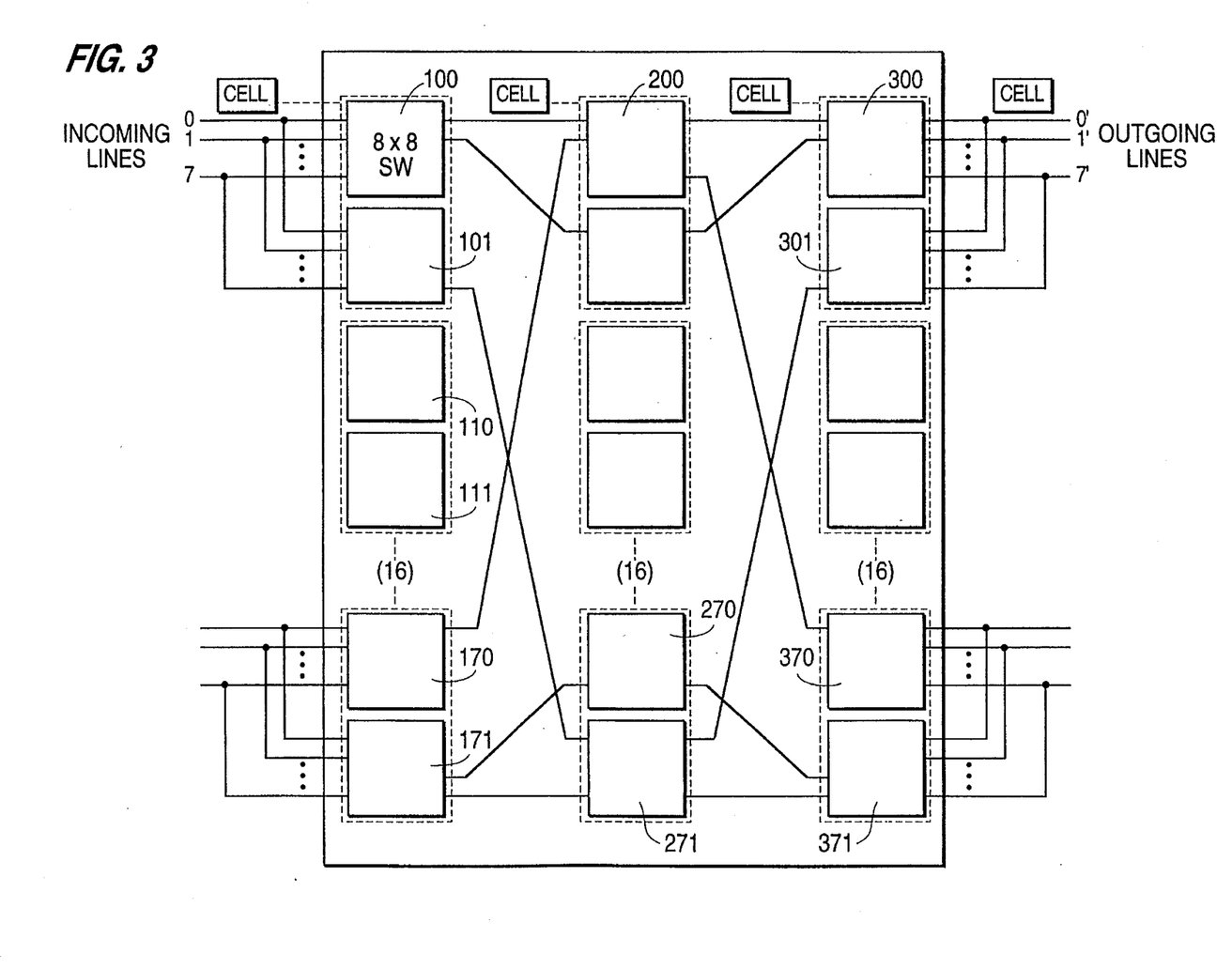
FIG. 3 is a diagram illustrating the link connection of the switching network 10 shown in FIG. 2(b) in normal condition.
Figure 4:
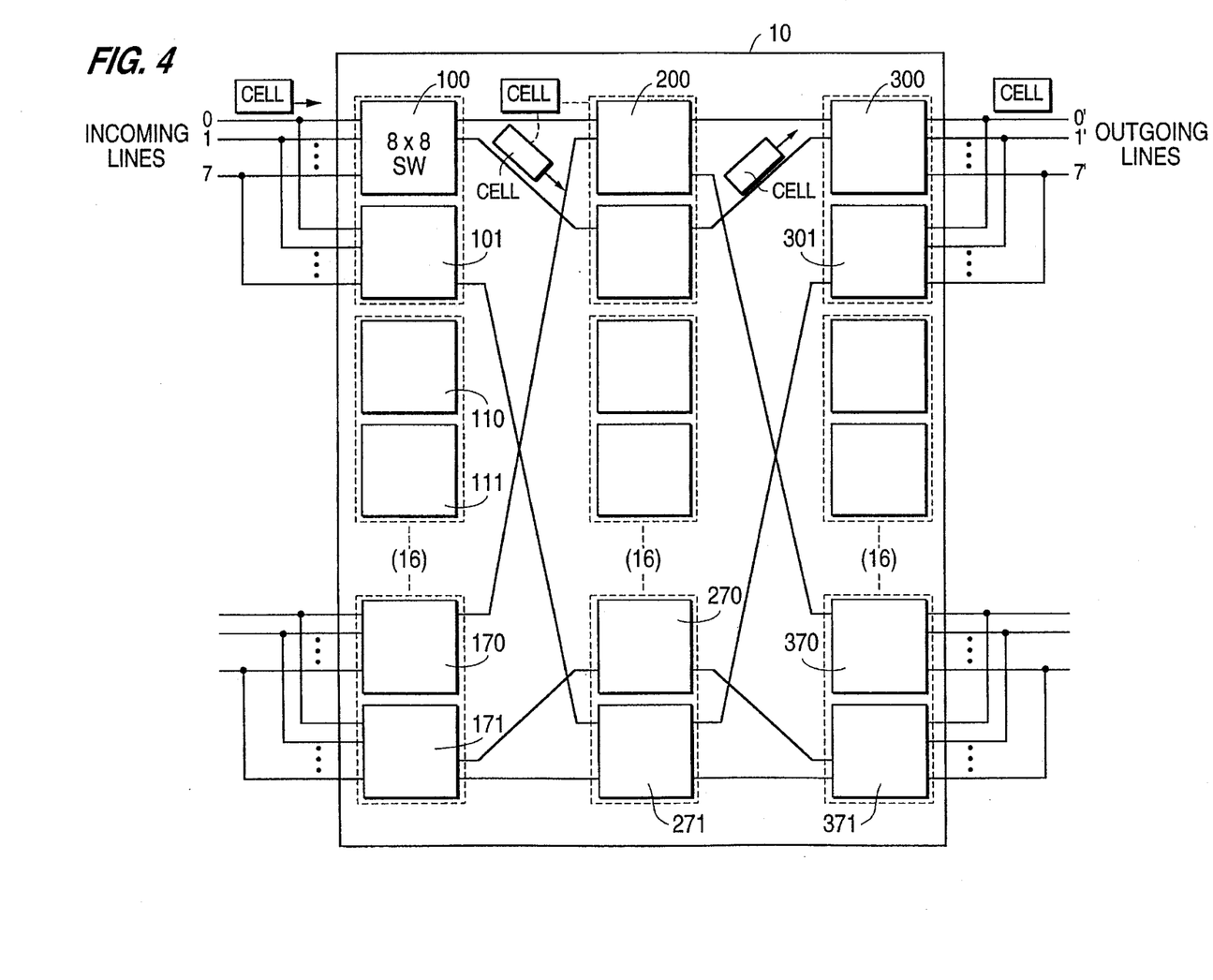
FIG. 4 is a diagram illustrating the link connection of the switching network 10 shown in FIG. 2(b) in which there is a faulty unit switch.

FIG. 3 illustrates a switching network in normal condition, that is, in a state without faults. FIG. 4 illustrates a switching network containing a faulty unit switch with cells bypassing the faulty unit switch through another link in the pair. In a normal state, the cells introduced via an incoming line are to pass through the links in accordance with the preset path information, via any one of the unit switches 100–171 at the first stage, one of the unit switches 200–271 at the second stage, and one of the unit switches 300–371 at the third stage in order to reach a designated outgoing line. In the case of the three-stage configuration shown in FIG. 3, a cell introduced via incoming line 0 passes through unit switches 100, 200 and 300 to reach outgoing line 0. FIG. 4 shows a case in which unit switch 200 is faulty, and a cell which is to pass through unit switches 100, 200, and 300 is caused to follow an altered route including unit switches 100, 201 and 300.

Figure 5B:
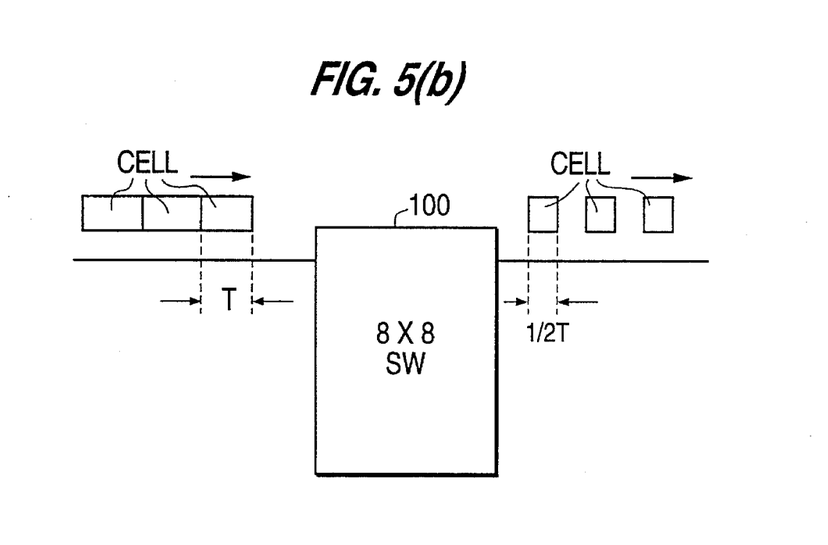

When one of the unit switches at the first stage accommodating the incoming lines and at the final stage accommodating the outgoing lines are in fault, the incoming and outgoing lines are connected to a link bypassing the faulty unit switch via one of a plurality of unit switches wired in parallel (increased switching network efficiency). FIG. 5(a) illustrates such a case with the pair of unit switches 100 and 101 being connected in parallel. Although the traffic at any unit switch other than the faulty switch will be overloaded when a cell to be passed through the latter is rerouted, this problem may be solved by setting the link transmission speed of the switch greater than the transmission speed of the incoming and outgoing lines. FIG. 5(b) illustrates a case in which the link transmission speed is set at twice that of the incoming and outgoing lines.

Figure 6:
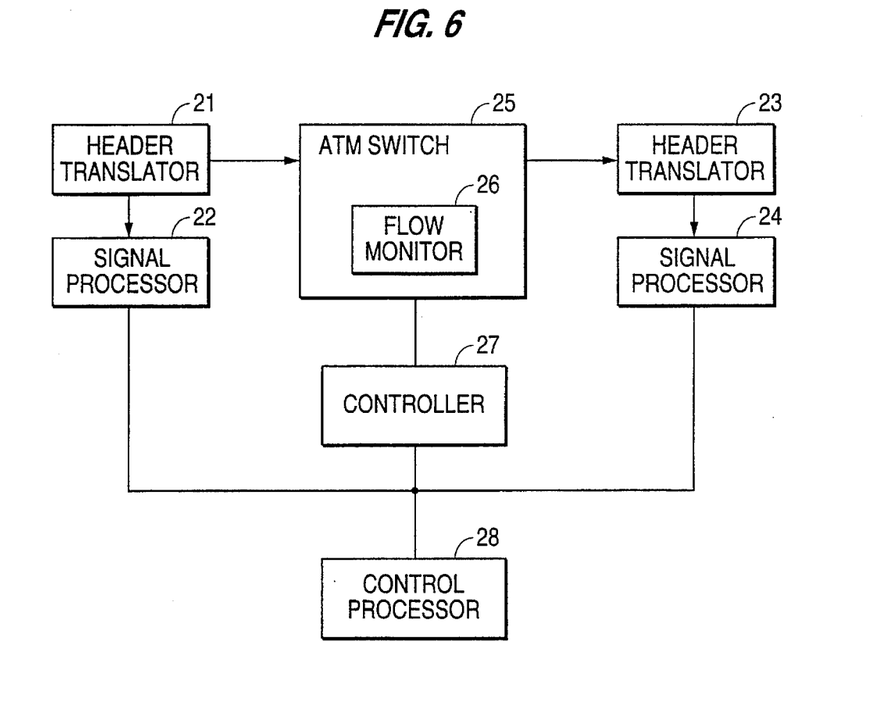
FIG. 6 is a partial block diagram of a switching network system.

FIG. 6 is a block diagram of a switching network.

The detection of a faulty unit switch is accomplished as follows:

(1) The flow monitor 26 monitors the amount of use of the buffer memory, the number of abandoned cells and the number of cells passed through each unit switch, and the central processor 28 decides that a switch is faulty when these numbers exceed the predetermined numbers.

(2) Self-check function of the cells: each cell has a portion for checking its own normality by the recommendation of CCITT, e.g., Header Error Check (HEC), Cyclic Redundancy Check (CRC), etc., and this portion is checked by the Header Translator (HT) 21, 23 placed at the front and rear of a switching network. Accordingly, a faulty unit switch is also detected through the self-check function.

Figure 7:
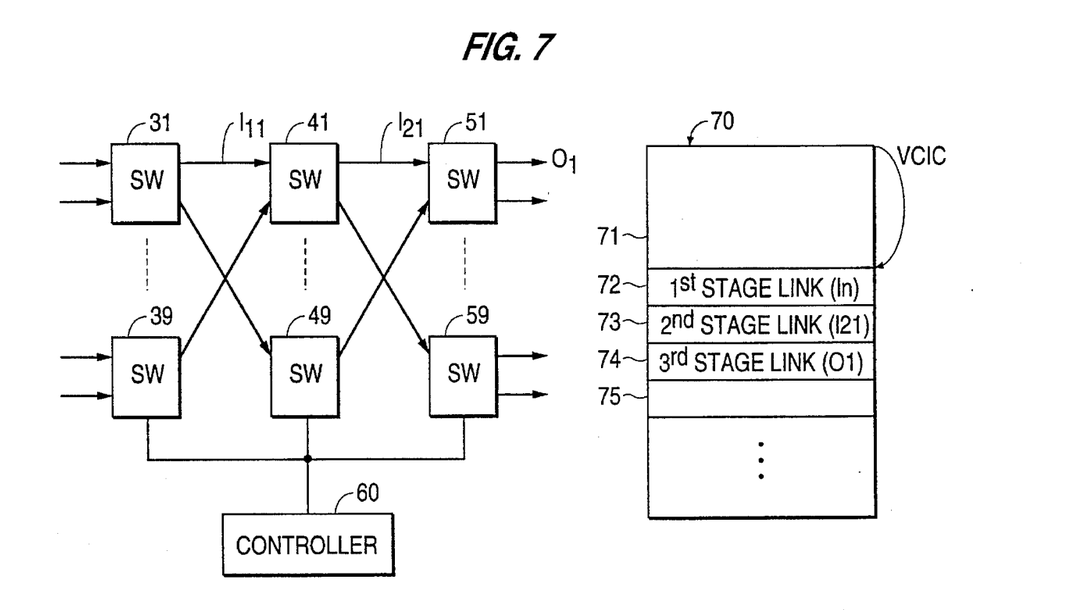
FIG. 7(a) is a schematic diagram of the link connections and FIG. 7(b) is an example of a connection data table of the links.

FIG. 7(a) is a schematic diagram of a link connection and FIG. 7(b) is an example of a connection data table 70 of the link. When a signal from a terminal device arrives at the network through its incoming line, the central processor (CP) 28 reads cells of the signal through the signal processor (SP) of the corresponding header translator (HT) and assigns its virtual channel identifier (VCI) to the terminal device. Based on the VCI, the central processor also assigns the unit switch number to which the incoming line should be connected and links such as $1_{11}$, and $1_{21}$ to outgoing line 0 which can be represented as "$a_1$" and sets a connection data table 70 shown in FIG. 7(b) in the header translator (HT) 21. Thereafter, all cells having header "$a_1$" pass through the same links $1_{11}$, and $1_{21}$ to outgoing line $0_1$, Accordingly, when the unit switch SW41 is faulty, the CP 28 makes it "busy" by inhibiting the use of the link ($1_{21}$) shown in the connection data 72 on the connection data table 70 of HT 21.

The CP 28 then establishes another link so that cells having the header a are detoured around the faulty switch SW41 according to the new connection data 72, and also instructs to the header translator the selection information for selecting either the 0 side unit switch or the 1 side unit switch of the paired unit switches in the first stage, which is appropriate for the new link connection. This alteration of the connection data 70 is possible because the CP28 obtains the latest traffic data by monitoring all the unit switches in the switching network. In order to provide another link, the present invention provides a redundancy of links by wiring each incoming and outgoing line in parallel to a plurality of unit switches in the first stage and final stage, respectively, and also applies a link transmission speed twice or more as high as the transmission speed of incoming and outgoing lines.

What is claimed is:

1. A switching system comprising:

a multistage switching network, operating in an asynchronous transfer mode, comprising
a plurality of switching stages including a first switching stage and a final switching stage, each of said first switching stage and said final switching stage including a plurality of pairs of unit switches, and
a plurality of links for connecting unit switches of adjoining switching stages as one switching network;

a plurality of incoming lines;

first connection means for connecting each incoming line of said incoming lines through a header translator in parallel to both unit switches of corresponding pair of unit switches in said first switching stage, a control line from said header translator being in parallel to both unit switches of corresponding pair of unit switches in said first switching stage, and selecting one of be unit switches of corresponding pair of unit switches to be used for signal cell routing by instruction of said header translator through said control line;

a plurality of outgoing lines;

second connection means for connecting each outgoing line of said outgoing lines in parallel to both of the unit switches of corresponding pair of unit switches in said final switching stage; and a control unit for controlling said links and said first connection means for forming selective link connections between said unit switches of said adjoining switching stages and, when there is a faulty unit switch in a particular switching stage, for treating said faulty unit switch as a busy unit switch and for forming an alternate link connection to another unit switch paired to said faulty unit switch in said particular switching stage;

wherein said multistage switching network has a link transmission speed for signal cells which is greater than signal cell transmission speed in said incoming and outgoing lines.

2. A switching system according to claim 1, further comprising means for detecting said faulty unit switch.

3. A switching system according to claim 2, wherein said detecting means comprises one of a flow monitor and signal cell self-check means.

4. An asynchronous transfer mode (ATM) switching system comprising:

a switching network of a multistage configuration including a plurality of pairs of unit switches in each stage connected to unit switches in an adjoining stage by forming one switching network by links, thereby forming an asynchronous transfer mode switching network;

each incoming line of said switching network being connected to both unit switches of corresponding pair of unit switches in a first stage of said switching network, and each outgoing line of said switching network being connected to both unit switches of corresponding pair of unit switches in a final stage of said switching network;

control means for controlling the link connection of said switching network;

said switching network further comprising header translator means for selecting one of the unit switches of said pair of unit switches to be used in the first stage of said switching network and for assigning link connection data to a signal input cell according to a connection data table which is set by said control means; and fault detecting means for individually detecting a faulty unit switch of a pair of unit switches;

said control means responding to detection of said faulty unit switch by said fault detecting means for arranging said connection data table in order not to use said faulty unit switch but to use another unit switch of said pair of unit switches to provide redundancy for switching input cells;

wherein said ATM switching system has no other switching network for redundancy, and link transmission speed through said links is greater than signal cell speed of said incoming and outgoing lines.

5. An ATM switching system according to claim 4, wherein said fault detecting means comprises flow monitor means.

6. An ATM switching system according to claim 4, wherein said fault detecting means comprises said header translator means for performing a signal cell self-check function.

* * * * *